(12) United States Patent
Bidwell et al.

(10) Patent No.: US 11,150,160 B2
(45) Date of Patent: Oct. 19, 2021

(54) VIBRATION TEST APPARATUS COMPRISING INDUCTIVE POSITION SENSING

(71) Applicant: Bruel & Kjaer Vts Limited, Royston (GB)

(72) Inventors: Tim Bidwell, Comberton (GB); Nicholas John Claydon, St. Neots (GB)

(73) Assignee: BRUEL & KJAER VTS LIMITED, Royston (GB)

( * ) Notice: Subject to any disclaimer, the term of this patent is extended or adjusted under 35 U.S.C. 154(b) by 672 days.

(21) Appl. No.: 16/071,259

(22) PCT Filed: Jan. 23, 2017

(86) PCT No.: PCT/EP2017/051294
§ 371 (c)(1),
(2) Date: Jul. 19, 2018

(87) PCT Pub. No.: WO2017/125599
PCT Pub. Date: Jul. 27, 2017

(65) Prior Publication Data
US 2021/0199534 A1      Jul. 1, 2021

(30) Foreign Application Priority Data

Jan. 22, 2016 (EP) .................................. 16152422

(51) Int. Cl.
*G01M 7/02* (2006.01)
(52) U.S. Cl.
CPC .................. *G01M 7/025* (2013.01)

(58) Field of Classification Search
CPC ...................................................... G01M 7/025
(Continued)

(56) References Cited

U.S. PATENT DOCUMENTS 3,803,906 A * 4/1974 Ross ..................... G05D 3/1445
73/805
3,948,087 A    4/1976 Shiraishi
(Continued)

FOREIGN PATENT DOCUMENTS

CN        1743824 A      3/2006
CN      101253390 A      8/2008
(Continued)

OTHER PUBLICATIONS

Hanson, B. et al., "Self-sensing applications for electromagnetic actuators," Sensors and Actuators A, vol. 116, No. 2, Oct. 15, 2004, pp. 345-351 (7 pages).
(Continued)

*Primary Examiner* — Lisa M Caputo
*Assistant Examiner* — Rose M Miller
(74) *Attorney, Agent, or Firm* — Nixon Peabody LLP

(57) ABSTRACT

A vibration test apparatus for vibrating a payload. The vibration test apparatus includes an inductive position sensor assembly which has a first member attached to a displaceable armature and a second member attached to a shaker frame. The inductive position sensor assembly is configured to generate at least one control signal indicative of an axial position of the armature based on a displacement dependent electromagnetic coupling between the first member and the second member.

15 Claims, 4 Drawing Sheets

(58) Field of Classification Search
USPC .................................................. 73/663, 664
See application file for complete search history.

(56) References Cited

U.S. PATENT DOCUMENTS

| | | | |
|---|---|---|---|
| 4,806,859 A * | 2/1989 | Hetrick | G01B 7/003 310/321 |
| 6,675,955 B2 * | 1/2004 | Nasser-Moghaddassi | B65G 27/24 198/766 |
| 7,868,609 B2 | 1/2011 | Zhitomirskiy | |
| 8,129,985 B2 | 3/2012 | Lee | |
| 8,321,173 B2 | 11/2012 | Wallance | |
| 2007/0006659 A1 * | 1/2007 | Schwartzbart | G01H 11/00 73/649 |
| 2008/0197836 A1 | 8/2008 | Lee | |
| 2009/0021245 A1 | 1/2009 | Lee | |
| 2011/0109303 A1 | 5/2011 | Zhitomirsky | |
| 2016/0273609 A1 * | 9/2016 | McDonough | F16F 13/10 |
| 2017/0016802 A1 * | 1/2017 | Brucke | G01M 7/02 |

FOREIGN PATENT DOCUMENTS

| | | |
|---|---|---|
| WO | WO 2004/061759 | 7/2004 |
| WO | WO 2005/085763 | 9/2005 |
| WO | WO 2009/115764 | 9/2009 |
| WO | WO 2015/150267 A1 | 10/2015 |

OTHER PUBLICATIONS

Nam, S.-B. et al., "A novel noncontact electromagnetic field-based sensor for the monitoring of resonant fatigue tests; a novel noncontact electromagnetic field-based sensor for the monitoring of resonant fatigue tests," Smart Materials and Structures, vol. 20, No. 3, Feb. 8, 2011 (13 pages).

International Search Report and Written Opinion in International Patent Application No. PCT/EP2017/051294, dated Apr. 19, 2017 (10 pages).

T. Baba et al.; "Construction of *Escherichia coli* K-12 in-frame, single-gene knockout mutants: The Keio collection"; Molecular Systems Biology; 2006; DOI: 10.1038/msb4100050 (11 pages).

A.M. Burroughs et al.; "Evolutionary Genomics of the HAD Superfamily: Understanding the Structural Adaptations and Catalytic Diversity in a Superfamily of Phosphoesterases and Allied Enzymes"; J. Mol. Biol. (2006) 361, pp. 1003-1034 (32 pages).

K. Datsenko et al.; "One-step inactivation of chromosomal genes in *Escherichia coli* K-12 using PCT products"; PNAS, vol. 97, No. 2, pp. 6640-6645; Jun. 6, 2000 (6 pages).

D. Gibson et al.; "Enzymatic assembly of DNA molecules up to several hundred kilobases"; Nature Methods, vol. 6, No. 5, pp. 343-347; May 2009 (5 pages).

L.-M. Guzman et al.; "Tight Regulation, Modulation, and High-Level Expression by Vectors Containing the Arabinose $P_{BAD}$ Promoter"; J. Bacteriol. vol. 177, No. 14, pp. 4121-4130; Jul. 1995 (10 pages).

G. Hasnain et al.; "Bacterial and plant HAD enzymes catalyze a missing phosphatase step in thiamin disphosphate biosynthesis"; Portland Press, copyright 2015 (20 pages).

Y. Komeda et al.; "A th-1 Mutant of *Arabidopsis thaliana* Is Defective for a Thiamin-Phosphate-Synthesizing Enzyme: Thiamin Phosphate Pyrophosphorylase"; Plant. Physiol. vol. 88, pp. 248-250; 1988 (3 pages).

R. Lennen et al.; "Transient overexpression of DNA adenine methylase enables efficient and mobile genome engineering with reduced off-target effects"; Nucleic Acids Research; Oct. 22, 2015 (14 pages).

J. Melnick et al.; "Identification of the Two Missing Bacterial Genes Involved in Thiamine Salvage: Thiamine Pyrophosphokinase and Thiamine Kinase"; J. Bacteriol. vol. 186, No. 11, pp. 3660-3662; 2004 (4 pages).

J. Norrander et al.; "Construction of improved M13 vectors using oligodeozynucleotide-directed mutagenesis"; Gene, vol. 26, pp. 101-106; Sep. 3, 1983 (6 pages).

G. Paglia et al.; "Development of a Metabolic Assay for the Analysis of Polar Metabolites Using HILIC UPLC/QToF MS"; Waters Corporation, copyright 2013 (10 pages).

G. Schyns et al.; "Isolation and Characterization of New Thiamine-Deregulated Mutants of *Bacillus subtilis*"; J. Bacteriol., vol. 187, No. 23, pp. 8127-8136; Dec. 2005 (10 pages).

E. Webb et al.; "Cell Biology and Metabolism: Characterization of *thiL*, encoding Thiamin-monophosphate Kinase, in *Salmonella typhimurium*"; J. Biol. Chem., vol. 272, Issue of Jun. 20, pp. 15702-15707; 1997 (7 pages).

* cited by examiner

VIBRATION TEST APPARATUS COMPRISING INDUCTIVE POSITION SENSING

CROSS-REFERENCE TO RELATED APPLICATIONS

This application is a U.S. National Stage of International Application No. PCT/EP2017/051294, filed Jan. 23, 2017, which claims the benefit of European Patent Application No. 16152422.8, filed Jan. 22, 2016, both of which are incorporated herein by reference in their entireties.

The present invention relates to a vibration test apparatus for vibrating a payload. The vibration test apparatus comprises an inductive position sensor assembly which comprises a first member attached to a displaceable armature and a second member attached to a shaker frame. The inductive position sensor assembly is configured to generate at least one control signal indicative of an axial position of the armature based on a displacement dependent electromagnetic coupling between the first member and the second member.

BACKGROUND OF THE INVENTION

A vibration testing system typically comprises a vibration test apparatus, sometimes referred to as a shaker, which is employed in industry for vibration testing of engineered products such as industrial equipment, elements and components. The object of vibration testing is to expose the industrial equipment or components to well-defined mechanical vibration of the frequency and amplitude to which that industrial equipment may be exposed in normal use. This is carried out to test the response of the equipment to the mechanical vibrations and detect reliability and ability of the equipment to sustain mechanical vibration without malfunctioning. The industrial equipment or components may come in a wide range of dimensions and weight. Large vibration testing systems may be capable of vibration testing very heavy and large objects like satellites.

The vibration test apparatus typically comprises an electrodynamic vibrator or shaker, a power amplifier, a control system, cooling systems and appropriate power and signal cables interconnecting these components. An armature of the electrodynamic vibrator is loaded by the industrial equipment/component to be tested and a suitable armature excitation signal is applied to a moving coil of the armature to vibrate the latter. The armature excitation signal may be supplied by a power amplifier coupled to the moving coil. The vibration test apparatus typically comprises a control system to detect and control the displacement or vibration of the armature. To detect the displacement, position or vibration of the armature, prior art vibration test apparatuses have used optical armature position sensing mechanisms and systems for instance operating by:
I. directing a beam of light at a target on the moving element and monitoring the light reflected;
II. directing a beam of light across a target on the moving element and monitoring the light not intercepted.

Both prior art approaches are subjected to various drawbacks: with approach I the target may be obscured by dirt or damaged; approach II may require very fine adjustment to ensure correct operation.

Hence, it would be highly desirable to devise an improved and more robust mechanism for detecting the displacement, position or vibration of the armature during operation of the vibration test apparatus.

SUMMARY OF THE INVENTION

A first aspect of the invention relates to a vibration test apparatus for vibrating a payload and comprising an electrodynamic shaker comprising a shaker frame and an armature with a payload support structure. The armature is axially displaceable or vibrateable relative to the shaker frame in accordance with an excitation or vibration signal supplied to the electrodynamic shaker. The vibration test apparatus further comprises an inductive position sensor assembly comprising a first member attached to the armature and a second member attached to the shaker frame wherein the inductive position sensor assembly is configured to generate at least one control signal indicative of an axial position of the armature based on a displacement dependent electromagnetic coupling between the first member and the second member in an axial direction of the armature. An armature control system of the vibration test apparatus is configured to control axial displacement or movement of the armature based on the at least one control signal.

The armature of the electrodynamic shaker is typically driven by a moving coil or drive coil firmly attached to the armature structure. The vibration test apparatus may comprise a suitable power amplifier which is coupled the moving coil for application of the armature excitation signal to the moving coil as discussed in further detail below with reference to the appended drawings. The armature excitation signal may have a frequency between 0 Hz and 10 KHz to cause a corresponding axially oriented displacement and vibration of the armature The second member may comprise a carrier board comprising one or more sensor coils that each is responsive to a magnetic field generated by an active magnetic or electromagnetic field generator mounted on the first member. According to this embodiment, the first member comprises the electromagnetic or magnetic field generator for applying the magnetic field to the one more sensor coils of the carrier board of the second member. The magnetic or electromagnetic field generator may comprise an alternating voltage or alternating current source configured to generate an alternating electromagnetic field having a predetermined excitation frequency such as an excitation frequency between 100 kHz and 10 MHz, more preferably between 500 kHz and 2 MHz. The magnetic field generator may be powered by a suitable power source such as a battery arranged in or on the first member. The armature control system is configured to detect amplitude changes and/or phase changes of respective coil signals generated by the one more sensor coils of the carrier board in response to relative displacement between the first member and the second member in the axial direction. Hence, the carrier board of the second member may have a plane elongate contour, e.g. rectangular, with a longitudinal axis extending in the axial displacement direction of the armature and the one more sensor coils may be arranged along the longitudinal axis of the carrier board. Thereby, providing a varying electromagnetic coupling between the magnetic field generator and each of the one more sensor coils along said longitudinal axis of the carrier board.

In a number of alternative embodiments, the electromagnetic field is generated by one or more excitation coils of the second member and the first member may include only passive circuitry responsive to the received electromagnetic field. The passive circuitry may comprise an electromagnetic resonator based on passive or unpowered components like inductors, resistors, capacitors etc. Hence, according to one embodiment of the invention, the second member comprises a carrier board comprising a first excitation coil or winding structure for emitting an electromagnetic field at a predetermined excitation frequency or frequency range. The first member comprises a passive electromagnetic resonator. The passive electromagnetic resonator may for example comprise a resonator coil and at least one capacitor electrically connected to the resonator coil to form a resonant circuit possessing a predetermined resonance frequency. The predetermined resonance frequency of the resonant circuit may lie between 0.1 MHz and 100 MHz such as between 1 MHz and 10 MHz such as about 4 MHz. Each of these frequency ranges is typically so far removed from the typical range of excitation frequencies utilized by the vibration test apparatus to drive the armature that electromagnetic interference is avoided. The excitation frequency range for the armature drive is often located from 0 Hz to 10 KHz.

The skilled person will understand that the frequency of the electromagnetic field emitted by the first excitation coil may be identical, or at least proximate to, the predetermined resonance frequency of the resonant circuit. The first member may comprise a substantially flat carrier board, such a printed circuit board (PCB), comprising an integrally formed conductor pattern comprising a plurality of turns of the resonator coil. Hence, the resonator coil or inductor of the first member may be fabricated at relatively low cost as an integral portion of the printed circuit board. The skilled person will understand that the printed circuit board may comprise a single-layer, double-layer or multi-layer structure such that the conductor pattern of the resonator coil may be arranged on an outer surface of the PCB or within an inner layer of the PCB.

The one or more excitation coils, e.g. the first excitation coil, of the second member may for example be separate components which are attached to a surface of the carrier board for example by soldering and gluing. The one or more excitation coils may alternatively be integrally formed with the carrier board for example as discussed below using respective wire patterns of a printed circuit board type of carrier. The carrier board of the second member may be extending along an axial displacement direction of the armature. The carrier board of the second member may possess a plane elongate contour, e.g. rectangular, with a longitudinal axis preferably extending in the axial displacement direction of the armature when mounted onto the shaker frame. The carrier board of the second member may comprise a printed circuit board (PCB) having the one or more excitation coil(s) integrally formed therein, or thereon, by respective conductive wire patterns of the printed circuit board. The skilled person will understand that the printed circuit board may comprise a single-layer, double layer or multi-layered structure. The respective conductive wire patterns of the one or more excitation coil(s) may be arranged on opposite outer surfaces of the PCB or at least one of the one or more excitation coil(s), e.g. a conductive wire pattern of the first excitation coil, may be fully or partly formed in intermediate or inner layers of the PCB if it has a multi-layered structure.

According to one embodiment of the inductive position sensor assembly, the first excitation coil is patterned along the longitudinal axis of the carrier board of the second member to provide a varying electromagnetic coupling to the passive electromagnetic resonator along said longitudinal axis. Hence, a resonator signal outputted by the passive electromagnetic resonator varies as a function of its position along the patterned first excitation coil and hence along the second member. The inductive position sensor assembly may therefore be configured generate the least one control signal indicative of the axial position of the armature based on the resonator signal generated by the passive electromagnetic resonator in response to the electromagnetic field emitted by the first excitation coil. The resonator signal may be coupled back to detection circuitry of the inductive position sensor assembly, which typically is mounted on or to the shaker frame or chassis, using various active digital and/or analog transmission circuits. The second member of the inductive position sensor assembly may for example comprise a dedicated coupling winding, surrounding the first excitation coil on the carrier board, to which the resonator signal is magnetically coupled. The inductive position sensor assembly may be connected to this dedicated coupling winding to detect and process the resonator signal.

According to yet another embodiment of the inductive position sensor assembly, the carrier board of the second member comprises a second excitation coil physically offset relative to the first excitation coil along the longitudinal axis of the carrier board. The second excitation coil is preferably patterned along the longitudinal axis of the carrier board to provide a varying electromagnetic coupling to the passive electromagnetic resonator along said longitudinal axis. The latter embodiment is discussed in further detail below with reference to the appended drawings. Various embodiments of the present inductive position sensor assembly based on such patterned excitation coils and passive electromagnetic resonators are described in additional detail in FIGS. 1-5 and accompanying paragraphs [0035]-[0047] of patent publication US 2011/0109303 A1 to Sagentia Sensors Limited. The content of US 2011/0109303 A1 is hereby incorporated by reference in its entirety.

A distance, measured along the longitudinal axis of the carrier board, between opposing outermost coil portions or sections of the first excitation coil may be larger than 50 mm such as larger than 100 mm. This distance may be selected in dependence of a maximum axial displacement range of the armature of a particular electrodynamic shaker. According to one embodiment, the distance between the opposing outermost coil sections of the first excitation coil may exceed the maximum axial displacement range of the armature where the latter is expressed as a peak-to-peak axial displacement. The maximum axial displacement range of the armature may lie between 40 mm and 120 mm for a number of useful embodiments of the electrodynamic shaker.

The armature control system may comprise a software programmable microprocessor for example comprising a programmable Digital Signal Processor. The microprocessor may be configured to execute an application program or software component as part of the armature control system. The application program or software component may be configured to detect, digitize and processes one or more sensor signals to generate the least one control signal. The latter may for example be digitally encoded and formatted according to a data communication protocol as discussed below in further detail below with reference to the appended drawings. Some or all electronic components and functions of the inductive position sensor assembly may be integrated with the armature control system. The armature control system may comprise a feedback loop for setting and maintaining a "Null" or quiescent position of the armature or for setting a particular axially off-set position of the armature as discussed in further detail below with reference to the appended drawings.

The vibration test apparatus may comprise a display to show various operational parameters and signals of the apparatus to relevant personnel. The display may be a component of an embedded or associated computing system of the vibration test apparatus. The display may be configured to show or display the least one control signal or various signals or signal statistics derived from the least one control signal in graphical and/or numerical format. The display of the vibration test apparatus may be physically arranged at different locations either at or on the vibration test apparatus or in a remote location from the vibration test apparatus for example in another room of the same building, or in another building. In one embodiment, the display is mounted to a housing or frame structure of the vibration test apparatus for example on the housing or frame structure of the power amplifier.

A second aspect of the invention relates to a method of detecting axial displacement or axial position of a displaceable armature of a vibration test apparatus, the method comprising:

a) attaching a first member of an inductive position sensor assembly to the displaceable armature,
b) attaching a second member of the inductive position sensor assembly to a shaker frame,
c) applying an armature excitation signal to a moving coil of the displaceable armature to axially displace or vibrate the armature relative to the shaker frame,
d) generating at least one control signal indicative of the position of the displaceable armature via a displacement dependent electromagnetic coupling between the first member and the second member,
e) detecting an instantaneous position of the displaceable armature based on the at least one control signal.

The methodology of detecting axial displacement of the armature may further comprise:
f) supplying an alternating excitation voltage at predetermined excitation frequency to a first excitation coil mounted on the first member to generate and emit an electromagnetic field from the first excitation coil,
h) inducing a resonator signal in a passive electromagnetic resonator mounted on the first member via the emitted electromagnetic field,
g) deriving the at least one control signal from the resonator signal.

BRIEF DESCRIPTION OF THE DRAWINGS

Preferred embodiments of the invention will be described in more detail in connection with the appended drawings, in which.

DETAILED DESCRIPTION OF PREFERRED EMBODIMENTS

Figure 1:
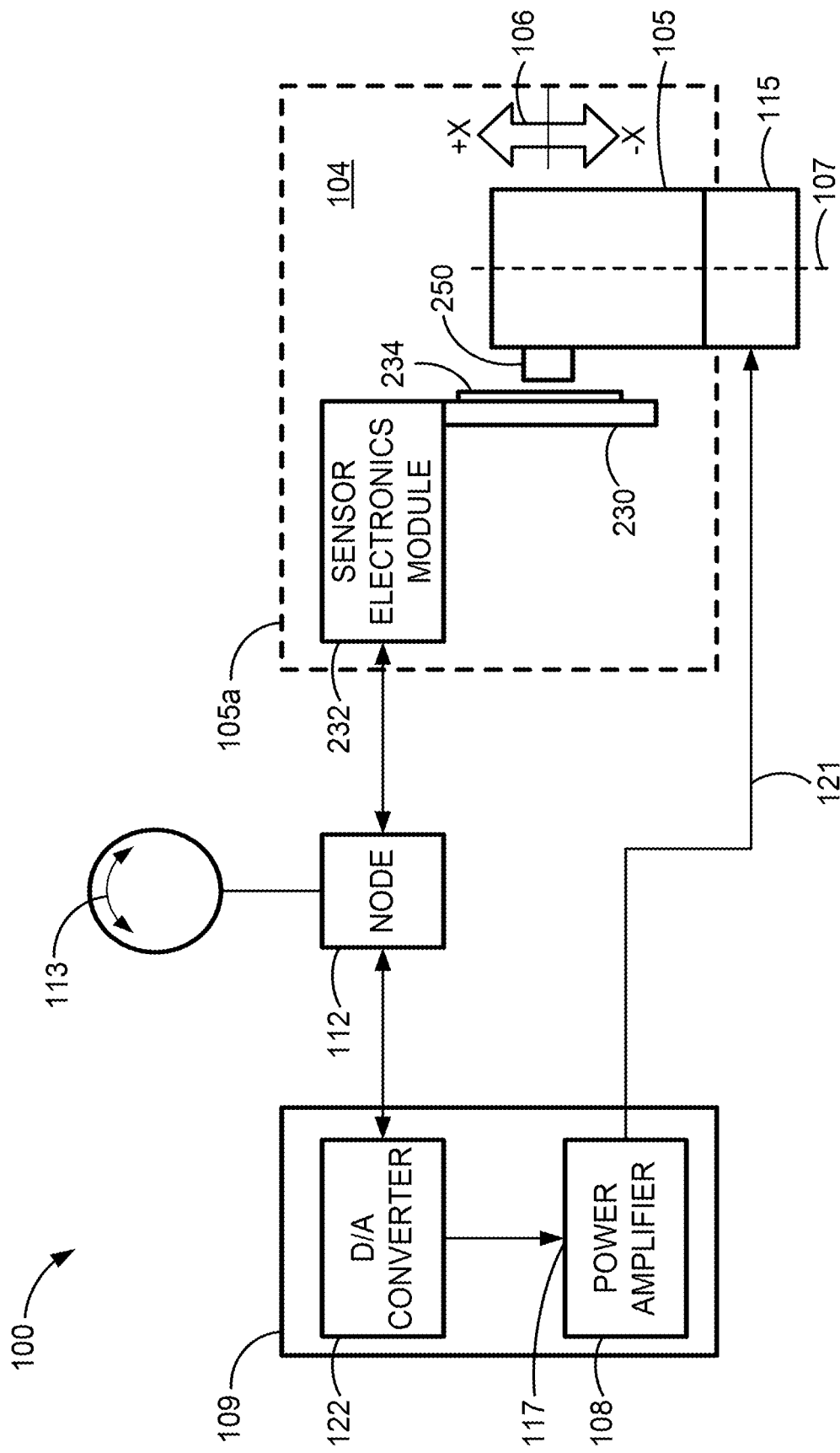
FIG. 1 shows a simplified schematic drawing of a vibration test apparatus or system comprising an inductive position sensor assembly in accordance with a first embodiment of the invention.

FIG. 1 shows a simplified schematic drawing of a vibration test apparatus or system 100 in accordance with a first embodiment of the invention. The skilled person will understand that the vibration test apparatus 100 may form part of a vibration testing system comprising various data logging devices and service devices coupled to the test apparatus via data communication links. Various operational parameters of the vibration test apparatus 100 may for example be logged during operation and transmitted to an internet connected computer server. The latter may reside in a cloud based computing center. The vibration test apparatus 100 comprises a power amplifier 108, for example integrated into a chassis or frame of the vibration test apparatus 100 or mounted in a separate amplifier system housing or casing 109. The power amplifier 108 may be operatively coupled to a displaceable or vibrateable armature 105 of an electrodynamic shaker 104 via a signal and power cable 121. The displaceable or vibrateable armature 105 may be mechanically coupled to an optional payload support structure (not shown). The latter may support or hold a payload which is the equipment or component undergoing vibratory test. The armature 105 of the electrodynamic shaker 104 is displaced or vibrated by an excitation or vibration signal supplied by the power amplifier 108 to a moving or inductive drive coil 115 of the armature 105. Hence, the armature excitation or vibration signal serves to axially displace the armature 105 relative to the chassis or frame of the electrodynamic shaker 104 in accordance with the flow of excitation or driver current through the moving coil 115 induced by the armature excitation signal. The armature 105 may vibrate in a reciprocating manner along the axial direction 107 of the armature, as schematically indicated by the arrow 106 indicating +/−X displacement, by a sinusoidal, random or transient armature excitation signal for example a sinusoidal signal with a frequency between 0 Hz and 20 kHz or below 10 kHz—for example depending on dimensions of the vibration test apparatus 100.

The vibration test apparatus 100 may comprise a display 113 which is mounted on a housing or frame 109 of the external power amplifier 108 or in a separate housing. A data logger (not shown) may be mounted inside the housing of the power amplifier 108 or together with the display 113 and configured to measure and record respective values of several operational parameters of the electrodynamic shaker 104 over time during its operation, i.e. during mechanical excitation of the payload. The operational parameters preferably include operating time and date of the electrodynamic shaker 104 to allow computation of an accumulated operational time since last service/overhaul. Furthermore, RMS current values and peak current values of a current flowing in the moving coil 115 of the vibrateable armature 105 may also recorded/logged during operating periods of time. In addition, DC current values and/or DC voltage values of a field coil (not shown) of the electrodynamic shaker 104 may also be measured and recorded provided that the electrodynamic shaker 104 comprises such a field coil. These RMS and peak current values may be measured directly or indirectly by suitable current sensors mounted inside the power amplifier 108 or current sensors mounted in the electrodynamic shaker 104. Various well-known types of current sensors may be utilized for this purpose such as Hall effect elements and inductive alternating current sensors. The skilled person will appreciate that the respective measurements and logging of the currents in the armature coil and field coil over time allow the armature force on the vibrateable armature 105 to be computed. The current in the field coil determines a magnetic field strength of the magnetic field in which the armature is movably suspended. Hence, the force produced by the armature 105 of the electrodynamic shaker 104 is directly proportional to the current flowing within the armature coil, the length of the armature coil conductor and the strength of the magnetic field that the armature coil is moving within.

Figure 2:
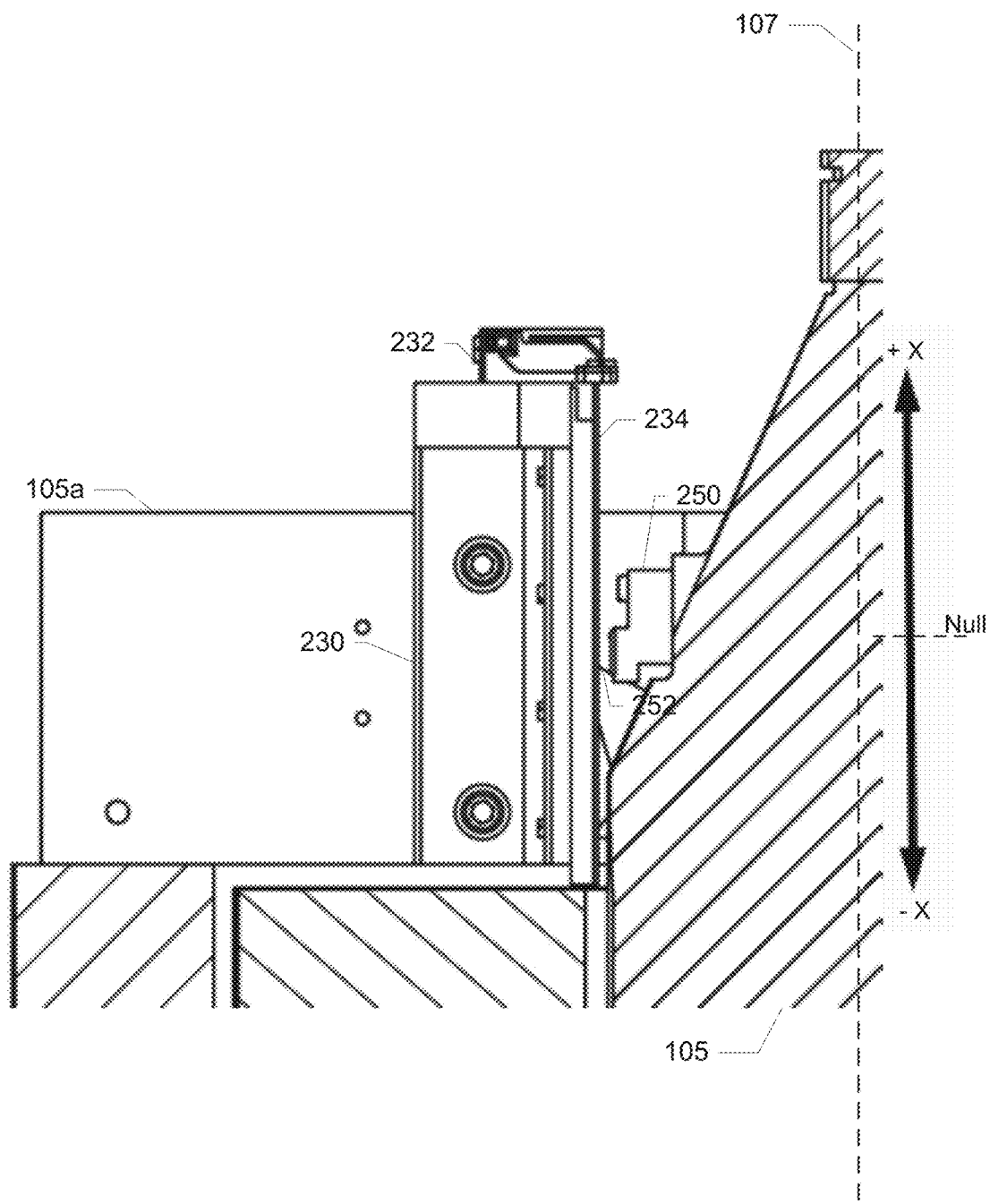
FIG. 2 is a schematic vertical cross-sectional illustration of the mounting of the inductive position sensor assembly to various components of the vibration test apparatus or system.
Figure 3:
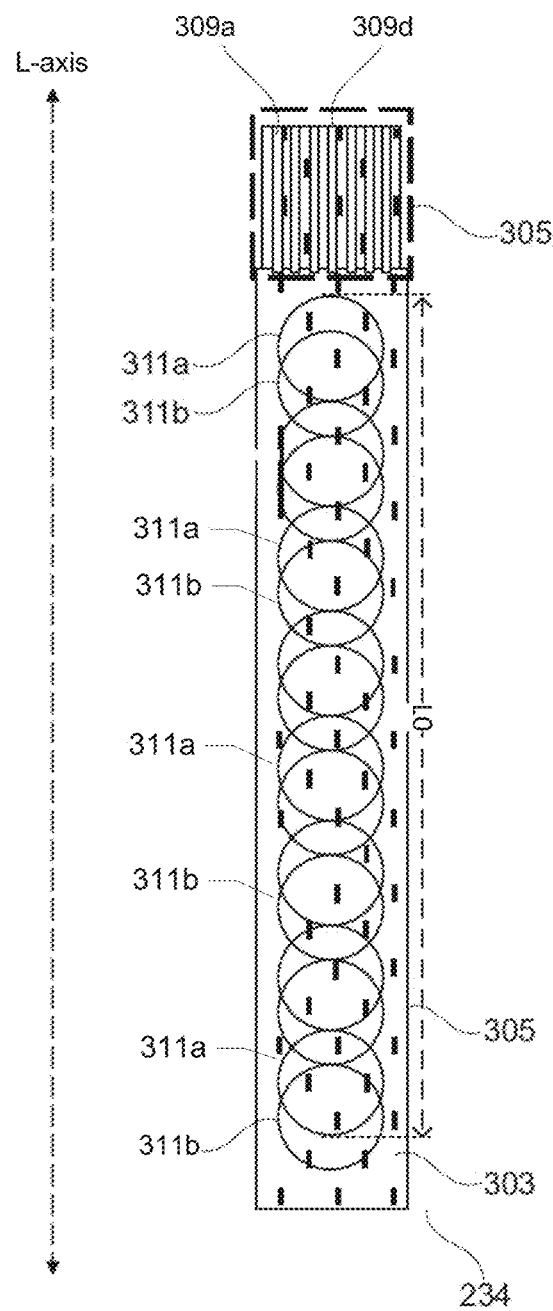
FIG. 3 shows an exemplary embodiment of a second member of the inductive position sensor assembly for mounting to a frame of an electrodynamic shaker.

The vibration test apparatus 100 additionally comprises an inductive position sensor assembly (230, 232, 234, 250) as illustrated in further detail on FIGS. 2 and 3. The inductive position sensor assembly is utilized by an armature control system of the vibration test apparatus 100 to detect and/or set or control the axial position or displacement of the armature 104 as discussed in further detail below. This feature is very helpful for numerous purposes for example:

A. as part of a manual or automatic control system that sets an initial axial position of the armature; usually 'centred' but sometimes (e.g. for shock testing) offset;
B. as part of an automatic control system that during operation maintains the initial axial position of the armature against any tendency to drift;
C. as part of a manual or automatic control system that adjusts vertical load support to compensate for the downward force exerted by the payload;
D. as part of an automatic control system that logs/records and displays the instantaneous axial position of the armature, for example supplying an armature position signal or vibration control signal output.

With respect to the functions B and C above, the automatic armature control system may form part of a self-centring system of the armature 105 often known as the VPC.

Prior art vibration test apparatuses have used optical armature position sensing systems for instance operating by:

III. directing a beam of light at a target on the moving element and monitoring the light reflected;
IV. directing a beam of light across a target on the moving element and monitoring the light not intercepted Both prior art approaches are subjected to various drawbacks: with approach I the target may be obscured by dirt or damaged; approach II may require very fine adjustment to ensure correct operation.

The inductive position sensor assembly comprises a second member 230 attached to the shaker frame or chassis 105a. The shaker frame 105a may remain essentially stationary relative to the surrounding test room structures or the shaker frame 105a may move in opposite direction to the vibrating armature 105. In the latter situation, the shaker frame 105a may for example be mounted on a suspension/isolation system where an amplitude of the shaker frame motion is proportional to a mass of the shaker frame 105a. The inductive position sensor assembly additionally comprises a first or movable member 250, or puck, attached to the vibrating armature 105. The inductive position sensor assembly is configured to generate at least one control signal indicative of a position or velocity of the vibrating/movable armature 105 based on a displacement dependent electromagnetic coupling between the first member 250 and the second member 234 induced by the above-mentioned relative axially directed displacement or movement between the vibrating armature 105 and shaker frame 105a. The at least one control signal is extracted or generated within a sensor electronics module 232 mounted on the stationary member 230. The at least one control signal may comprise at least one position or displacement signal indicative of the instantaneous axial position of the movable armature 105 and an off-set signal indicative of the axial off-set of the movable armature 105 relative to a Null or quiescent position indicated by the horizontal line crossing the axial displacement direction arrow 106. The position signal and off-set signal are utilized by the armature control system of the vibration test apparatus 100 to detect and control the axial displacement of the movable armature 105 within the maximum range of axial displacement of the armature. This armature control system preferably comprises the previously discussed self-centring system.

The armature control system comprises a first data communication interface, bus or network 111, e.g. according to the TIA-485/RS 485 standard), transmitting the position signal and off-set signal in respective digitized or data formats to an optional intermediate node 112 which may house or comprise the display 113 allowing certain features of the position signal and/or off-set signal to be displayed to the system operator for system surveillance or monitoring. The off-set signal may be processed by a suitable digital processor of the intermediate node 112 and a resulting position signal, e.g. relative to the Null, graphically displayed. The off-set signal is transmitted via the first data communication network 111 to a D/A converter 122 mounted in the amplifier system housing or casing 109. The skilled person will understand that the D/A converter 122 in practice may be integrated with the power amplifier in a common housing or casing. The D/A converter 122 may comprise a suitable data communication interface for extracting the digitized off-set signal from the received data stream. The D/A converter 122 generates the off-set signal in analog format and applies the latter to an input 117 of the power amplifier 108. The power amplifier 108 produces in response an amplifier or buffered version of the off-set signal which in turn is applied to the moving or drive coil 115 via the power cable 121.

The overall effect of the off-set signal within the armature control system is to force the movable armature 105 back to the desired, "null", position in some situations. The inductive position sensor assembly repeatedly detects axial displacement or motion of the armature 105 and if the latter moves away from the "null" position, the control system produces the amplified or buffered offset signal to the armature coil 115 with appropriate phase and level to return the armature to the indicated null position. This feedback control loop of the armature control system enables the vibration test apparatus 100 to compensate for inertias/loads of the combined armature 105 and payload (equipment or component under vibratory test). The control system may also be configured to set a particular axial position of the movable armature 105, for example deliberately off-set from the "null" position, as discussed under point A. above.

FIG. 2 is a schematic vertical cross-sectional illustration of the mounting of the inductive position sensor assembly to the vibrating armature structure 105 and the shaker frame or chassis 105a in accordance with one embodiment of the present vibration test apparatus or system 100. The inductive position sensor assembly comprises the stationary or second member 230 which is attached directly or indirectly to the shaker frame or chassis 105a. The shaker frame or chassis 105a may remain essentially stationary relative to the structures of the surrounding environment such as floor and walls of the test room. The inductive position sensor assembly additionally comprises the movable member 250, or puck 250, attached to the vibrating armature 105. The sensor electronics module 232 is also attached to the shaker frame or chassis 105a and electrically or optically coupled to the stationary member 230 for receipt of the at least one armature position signal for example a one or more individual coil signals derived from respective ones of a plurality of sensor coils of the second member 230 or a passive electromagnetic resonator of the first member as discussed in additional detail below. The sensor electronics module 232 may be integrated with the armature control system and configured to derive the above-discussed control signal(s) indicative of the axial position of the armature and axial off-set of the armature. The stationary member 230 may comprise a flat elongate carrier board 234 having a longitudinal axis extending along an axial direction 107 of the armature 104. An exemplary embodiment of the carrier board 234 comprises a first excitation winding structure and a second excitation winding structure physically off-set from each other along the carrier board 234 as discussed below in connection with FIG. 3.

Another exemplary embodiment of the carrier board 234 comprises plurality of sensor coils arranged in an overlapping pattern or a non-overlapping pattern along the longitudinal axis of the carrier board.

The carrier board 234 is preferably mounted spaced apart from an outer surface of the shaker frame or body by a distance of at least 3 mm such as more than 5 mm, as measured in a direction orthogonally to the axial displacement direction of the armature. This spacing reduces magnetic interference between the material of the shaker frame or body and magnetic fields of the one or more sensor coils or the one or more excitation coils or winding structures.

The carrier board 234 is attached to the stationary member 230 such that a substantially flat outer surface of the carrier board 234 faces an outer surface of the movable member 250. The flat outer surface of the carrier board 234 and the outer surface of the movable member 250 are separated by an intervening air gap 252 such that the armature 105 can vibrate unrestricted in the axial direction 107. A height of the air gap 252, as measured in a direction orthogonal to the axial direction 107 of the armature 105, may for example be smaller than 20 mm such as between 3 and 15 mm. This height constraint is preferably complied with at least along the maximum range of axial displacement of the armature to ensure unhindered relative motion between the first member and second member.

One embodiment of the movable member 250 comprises a passive or unpowered resonant circuit comprising coil or inductor (not shown) coupled to one or more capacitors to give a certain resonance frequency. The first member may comprise a substantially flat carrier board, such a printed circuit board (PCB), supporting a separate coil component or including an integrally formed conductor pattern forming the passive coil. The passive coil may comprise a plurality of turns formed as PCB wires or traces. Hence, the first member including the passive coil may be fabricated at relatively low cost using industry standard printed circuit board manufacturing techniques, materials and components. A resonance frequency of the passive resonant circuit may lie between 1 MHz and 10 MHz such as about 4 MHz for the previously discussed reasons. The carrier board of the movable member is preferably mounted spaced apart from an outer surface of the armature 105 by a distance of at least 5 mm, such as more than 10 mm, as measured in a direction orthogonally to the axial displacement direction of the armature. This spacing reduces magnetic interference between the armature material which often comprises magnetically permeable material and a magnetic field of the passive coil.

The sensor electronics module 232 may comprise digital processor such as a software programmable microprocessor (not shown), e.g. comprising a Digital Signal Processor. The microprocessor may form part of an embedded computing board or sub-system mounted inside a housing of the sensor module 232. The microprocessor may be configured to execute an application program or software component as part of the armature control system. The application program or software component may be configured to detect, digitize and processes the previously discussed coil signals generated by respective ones of a plurality of sensor coils to generate the position signal and/or the off-set signal for example in digitally encoded format as discussed above for convenient transmission of these signals to other components of the armature control system. The application program or software component comprises a set of microprocessor executable program instructions. The digital processor of the intermediate node 112 may be configured to record or log the position signal and/or the off-set signal during operation of the vibration test apparatus 100 in a non-volatile memory device such as a magnetic disc drive or solid-state memory e.g. FLASH memory.

FIG. 3 shows an exemplary embodiment of the carrier board 234 of the second member of the inductive position sensor assembly. The carrier board 234 is preferably fixedly mounted to the shaker frame (105a of FIG. 4). The carrier board 234 preferably comprises a printed circuit board (PCB). The carrier board 234 may have a plane, flat and elongate rectangular outer contour with a longitudinal axis, as indicated by the L-axis arrow, extending in the axial displacement direction of the armature when carrier board 234 is appropriately mounted onto the shaker frame. The rectangular carrier board 234 may have a length between 100 mm and 250 mm and a width between one-fifth and one-tenth of the length. A plane outer surface 303 of rectangular carrier board 234 comprises the first excitation coil or winding structure 311a. The first excitation coil or winding structure 311a may be integrally formed together with the carrier board for example as wire traces formed by conductive printed circuit board material, e.g. copper. The first excitation coil or winding structure 311a has multiple turns form a plurality of figure "8" like winding patterns extending along the longitudinal axis of the board from the proximal section of the carrier board 234 at the connector section 305 of the board down to the opposing distal portion or end of the carrier board 234. A distance between opposing outermost wire portions or sections of the first excitation coil, as indicated by LO, may be larger than 50 mm such as larger than 100 mm, for example from 120 mm to 220 mm, measured along the L-axis of the carrier board 234. This distance may vary depending on a maximum axial displacement range of the armature of a particular electrodynamic shaker. The figure "8" like pattering of the windings of the first excitation coil structure provides a varying electromagnetic coupling to the previously discussed passive electromagnetic resonator mounted on the carrier of the movable member 250 along said longitudinal axis. Hence, a resonator signal outputted by the passive electromagnetic resonator in response to the electromagnetic field emitted by the first excitation winding structure 311a varies as a function of its position along the carrier board 234 of the second member. The length of the previously discussed coil of the passive electromagnetic resonator along the longitudinal axis of the carrier board 234 is preferably much smaller, e.g. less than one-tenth, than the above-discussed distance between the opposing outermost wire portions or sections of the first excitation winding structure 311a.

The resonator signal may be coupled back to detection circuitry of the sensor electronics module 232 via a suitable magnetic or electromagnetic transmission or coupling mechanisms, preferably involving wireless signal transmission. One such embodiment exploits magnetic coupling from the coil of the passive electromagnetic resonator to a dedicated coupling winding arranged on, or in, the carrier board 234 of the second member. The dedicated coupling winding may for example be arranged at a peripheral section of the carrier board 234 and surrounding the first and second excitation winding structures. The detection circuit is electrically connected to this dedicated coupling winding for receipt of the resonator signals and derive the control signal therefrom.

The rectangular carrier board 234 additionally comprises a second, optional, excitation coil or winding structure 311b. The second excitation winding structure 311b has been illustrated as overlapping the first excitation winding structure 311a to make the winding structure 311b visible. However, the second excitation winding structure 311b is in practice arranged on a different surface, or a different layer, of the carrier board 234 than the first excitation winding structure 311a. The second excitation winding structure 311b is physically off-set relative to the first excitation winding 311a along the L-axis of the carrier board 234 as shown. This physical offset may correspond to one-quarter of a single figure "8" patterned winding section. The second excitation winding structure 311b may otherwise be substantially identical to the first excitation winding structure e.g. in terms of dimensions, shape and material etc.

A connector section 305 of the carrier board 234 comprises a plurality of conductive coil coupling terminals 309a-309d etc. electrically connected to respective ones of the first and second excitation windings 311a, 311b. The connector section 305 is utilized to couple first and second coil excitation signals to the first and second excitation windings 311a, 311b, respectively, to cause these windings to emit corresponding electromagnetic fields. The first and second coil excitation signals may be generated by one or several programmable high-frequency signal generator(s) within the previously discussed sensor electronics module 232 of the inductive position sensor assembly. The skilled person will understand that the frequency of each of the first and second coil excitation signals applied to the first and second excitation windings 311a, 311b, respectively, may be identical, or at least proximate to, the previously discussed predetermined resonance frequency of the passive electromagnetic resonator mounted on the carrier of the movable member 250.

In some embodiments of the inductive position sensor assembly amplitude differences and/or phase differences between the first and second resonator signals generated by the passive electromagnetic resonator in response to the respective electromagnetic fields emitted by the first and second excitation windings 311a, 311b are exploited by the detection circuitry of the sensor electronics module 232 to derive one or several control signal(s) indicative of the axial position of the armature. Some embodiments of the present invention may incorporate inductive position sensing mechanisms, functions and circuits based on patterned excitation coils and passive electromagnetic resonators disclosed in patent publication US 2011/0109303 A1 to Sagentia Sensors Limited.

Figure 4:
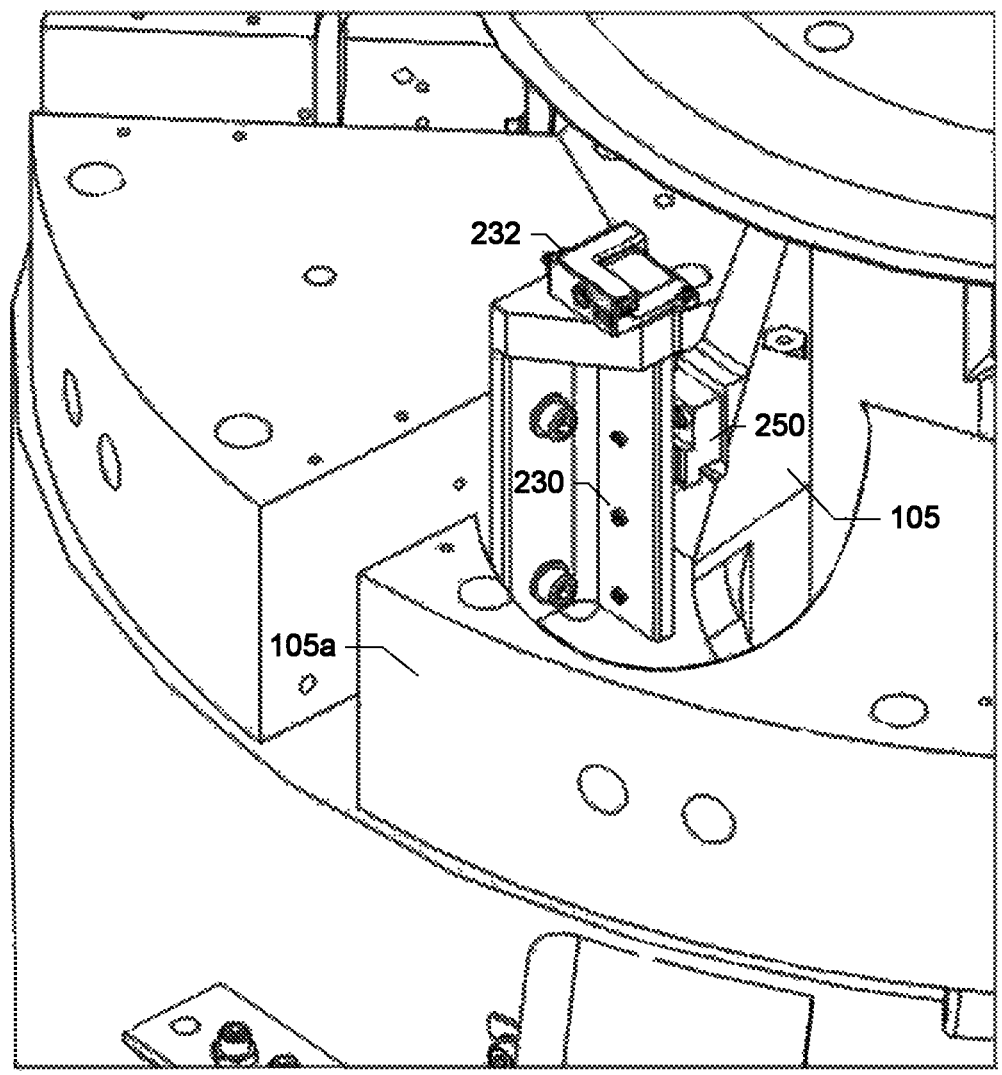
FIG. 4 is a cut-through perspective illustration of the mounting of the first member and second member of the inductive position sensor assembly to respective structures of the vibration test apparatus or system.

FIG. 4 shows a cut-through perspective illustration of how the components of the inductive position sensor assembly is mounted to the previously discussed components/structures of the vibration test apparatus or system 100. The cylindrical structure of the axially displaceable armature 105 is evident.

The invention claimed is:

1. A vibration test apparatus for vibrating a payload, comprising:

an electrodynamic shaker comprising a shaker frame and an armature with a payload support structure, wherein the armature is displaceable or vibrateable relative to the shaker frame in accordance with an excitation or vibration signal supplied to the electrodynamic shaker;

an inductive position sensor assembly comprising a first member attached to the armature and a second member attached to the shaker frame; the inductive position sensor assembly being configured to generate at least one control signal indicative of a position of the armature based on a displacement dependent electromagnetic coupling between the first member and the second member in an axial direction of the armature, the axial direction being along an elongated length of the armature and parallel with the displaceable or vibrateable movement of the armature;

an armature control system configured to control axial displacement of the armature based on the at least one control signal, wherein the second member includes a carrier board having a first excitation coil for emitting an electromagnetic field at a predetermined excitation frequency, and wherein the first member includes a passive electromagnetic resonator.

2. A vibration test apparatus according to claim 1, wherein second member comprises a carrier board comprising one or more sensor coils attached to, or integrated on the carrier board; and the first member comprises a magnetic field generator for applying a magnetic field to the one more sensor coils of the carrier board; said magnetic field generator comprising an alternating voltage or alternating current source configured to generate an alternating electromagnetic field having a predetermined excitation frequency between 100 kHz and 10 MHz; and wherein the armature control system is configured to detect level changes or phase changes of coil signals generated by the one more sensor coils of the carrier board in response to relative displacement between the first member and the second member in the axial direction.

3. A vibration test apparatus according to claim 1, wherein the passive electromagnetic resonator comprises a resonator coil and at least one capacitor electrically connected to the passive electromagnetic resonator to form a resonant circuit possessing a predetermined resonance frequency between 1 MHz and 10 MHz.

4. A vibration test apparatus according to claim 3, wherein the first member comprises a substantially flat carrier board including an integrally formed conductor pattern comprising a plurality of turns of the resonator coil.

5. A vibration test apparatus according to claim 1, wherein the carrier board of the second member has a plane elongate contour with a longitudinal axis extending in the axial displacement direction of the armature; wherein the first excitation coil is patterned along the longitudinal axis of the carrier board to provide a varying electromagnetic coupling to the passive electromagnetic resonator along said longitudinal axis.

6. A vibration test apparatus according to claim 5, wherein the inductive position sensor assembly is configured generate the least one control signal indicative of the axial position of the armature based on a resonator signal generated by the passive electromagnetic resonator in response to the electromagnetic field emitted by the first excitation coil.

7. A vibration test apparatus according to claim 5, wherein a distance, measured along the longitudinal axis of the carrier board of the second member, between opposing outermost coil sections of the first excitation coil is larger than 50 mm.

8. A vibration test apparatus according to claim 7, wherein the distance between the opposing outermost coil sections of the first excitation coil exceeds a maximum axial displacement range of the armature.

9. A vibration test apparatus according to claim 1, wherein the first member is spaced apart from an outer surface of the armature by a distance of at least 5 mm as measured in a direction orthogonally to the axial displacement direction of the armature.

10. A vibration test apparatus according to claim 1, wherein the second member and the first member are separated by an air gap; wherein a height of the air gap measured in a direction orthogonal to the axial displacement direction of the armature is smaller than 20 mm at least along a maximum axial displacement range of the armature.

11. A vibration test apparatus according to claim 2, wherein the carrier board of the second member comprises a printed circuit board having the first excitation coil, or the one or more sensor coils, integrally formed in, or on, the printed circuit board by respective conductive wire patterns.

12. A vibration test apparatus according to claim 5, wherein the carrier board of the second member comprises a second excitation coil physically offset relative to the first excitation coil along the longitudinal axis of the carrier board; said second excitation coil being patterned along the longitudinal axis of the carrier board to provide a varying electromagnetic coupling to the passive electromagnetic resonator along said longitudinal axis.

13. A vibration test apparatus according to claim 1, wherein the inductive position sensor assembly is configured to generate:
  a first control signal indicative of an instantaneous position of the armature in the axial displacement direction of the armature; and
  a second control signal indicative of an offset of the armature position relative to a quiescent or null position of the armature along the axial direction of the armature.

14. A vibration test apparatus for vibrating a payload, comprising:
  an electrodynamic shaker comprising a shaker frame and an armature with a payload support structure, wherein the armature is displaceable or vibrateable relative to the shaker frame in accordance with an excitation or vibration signal supplied to the electrodynamic shaker;
  an inductive position sensor assembly comprising a first member attached to the armature and a second member attached to the shaker frame; the inductive position sensor assembly being configured to generate at least one control signal indicative of a position of the armature based on a displacement dependent electromagnetic coupling between the first member and the second member in an axial direction of the armature, the axial direction being along an elongated length of the armature and parallel with the displaceable or vibrateable movement of the armature;
  an armature control system configured to control axial displacement of the armature based on the at least one control signal,
  wherein second member includes a carrier board having one or more sensor coils attached to, or integrated on, the carrier board,
  wherein the first member includes a magnetic field generator for applying a magnetic field to the one more sensor coils of the carrier board, the magnetic field generator including an alternating voltage or alternating current source configured to generate an alternating electromagnetic field having a predetermined excitation frequency between 100 kHz and 10 MHz; and
  wherein the armature control system is configured to detect level changes or phase changes of coil signals generated by the one more sensor coils of the carrier board in response to relative displacement between the first member and the second member in the axial direction.

15. A vibration test apparatus for vibrating a payload, comprising:
  an electrodynamic shaker comprising a shaker frame and an armature with a payload support structure, wherein the armature is displaceable or vibrateable relative to the shaker frame in accordance with an excitation or vibration signal supplied to the electrodynamic shaker;
  an inductive position sensor assembly comprising a first member attached to the armature and a second member attached to the shaker frame; the inductive position sensor assembly being configured to generate at least one control signal indicative of a position of the armature based on a displacement dependent electromagnetic coupling between the first member and the second member in an axial direction of the armature, the axial direction being along an elongated length of the armature and parallel with the displaceable or vibrateable movement of the armature;
  an armature control system configured to control axial displacement of the armature based on the at least one control signal,
  wherein the inductive position sensor assembly is configured to generate:
  a first control signal indicative of an instantaneous position of the armature in the axial displacement direction of the armature; and
  a second control signal indicative of an offset of the armature position relative to a quiescent or null position of the armature along the axial direction of the armature.

* * * * *